(12) United States Patent
Cheng

(10) Patent No.: US 8,957,617 B2
(45) Date of Patent: Feb. 17, 2015

(54) CONTROLLER AND METHOD FOR IMPROVING MOTOR DRIVING EFFICIENCY

(71) Applicant: Mao-Hsin Cheng, Zhubei (TW)

(72) Inventor: Mao-Hsin Cheng, Zhubei (TW)

(73) Assignee: Padauk Technology Co., Ltd., Hsin-Chu (TW)

( * ) Notice: Subject to any disclaimer, the term of this patent is extended or adjusted under 35 U.S.C. 154(b) by 202 days.

(21) Appl. No.: 13/851,820

(22) Filed: Mar. 27, 2013

(65) Prior Publication Data

US 2013/0264982 A1    Oct. 10, 2013

(30) Foreign Application Priority Data

Apr. 10, 2012  (TW) ............................. 101112559 A

(51) Int. Cl.
*H02P 6/08*         (2006.01)
(52) U.S. Cl.
USPC ............ 318/400.26; 318/400.06; 318/400.14; 318/400.22; 318/254; 388/811; 388/831
(58) Field of Classification Search
USPC ............. 318/400.06, 400.14, 400.22, 400.26, 318/254; 388/811, 831
See application file for complete search history.

(56) References Cited

U.S. PATENT DOCUMENTS

| | | | |
|---|---|---|---|
| 6,995,534 B2 * | 2/2006 | Berroth et al. ........... | 318/400.22 |
| 7,030,584 B1 | 4/2006 | Alberkrack | |
| 7,259,531 B1 | 8/2007 | Liu | |
| 7,580,617 B2 * | 8/2009 | Yabe .............................. | 388/811 |
| 2004/0056617 A1 * | 3/2004 | Berroth et al. ................ | 318/439 |
| 2005/0258789 A1 * | 11/2005 | Getz et al. ..................... | 318/254 |
| 2007/0216345 A1 * | 9/2007 | Kanamori ..................... | 318/814 |
| 2008/0050101 A1 * | 2/2008 | Yabe .............................. | 388/831 |
| 2010/0117571 A1 * | 5/2010 | Leong et al. ............. | 318/400.06 |
| 2010/0117573 A1 * | 5/2010 | Cheng ...................... | 318/400.14 |
| 2010/0134055 A1 * | 6/2010 | Leong et al. ............. | 318/400.14 |
| 2011/0181214 A1 * | 7/2011 | Nakahata et al. ........ | 318/400.04 |
| 2011/0260669 A1 * | 10/2011 | Nakahata et al. ............. | 318/503 |
| 2012/0044644 A1 * | 2/2012 | Harlan et al. ................. | 361/695 |
| 2012/0086378 A1 * | 4/2012 | Chiu et al. .................... | 318/463 |
| 2012/0274247 A1 * | 11/2012 | Zhao et al. ............... | 318/400.01 |
| 2013/0170951 A1 * | 7/2013 | Sato .................................. | 415/1 |
| 2013/0181651 A1 * | 7/2013 | Lee .............................. | 318/503 |
| 2014/0062360 A1 * | 3/2014 | Muramatsu et al. ..... | 318/400.14 |

* cited by examiner

*Primary Examiner* — Paul Ip
(74) *Attorney, Agent, or Firm* — Tung & Associates

(57) ABSTRACT

The present invention discloses a controller and a method for improving motor driving efficiency. According to the present invention, multiple control parameters are inputted to the controller so that the controller can adjust timings of PWM driving signals for driving the motor to advance or delay the turned-ON or turned-OFF points, whereby the motor is driven efficiently.

22 Claims, 10 Drawing Sheets

US 8,957,617 B2

CONTROLLER AND METHOD FOR IMPROVING MOTOR DRIVING EFFICIENCY

CROSS REFERENCE

The present invention claims priority to TW 101112559, filed on Apr. 10, 2012.

BACKGROUND OF THE INVENTION

1. Field of Invention

The present invention relates to a controller and a method for improving motor driving efficiency.

2. Description of Related Art

In driving a motor, typically, a HALL sensor is used in the motor control system; the HALL sensor outputs a HALL signal, based on which a PWM driving signal is generated to control a motor driver circuit, and the latter controls the operation of the motor in response to the PWM driving signal. The physical location of the HALL sensor affects the switching of the PWM driving signal and the motor driving current waveform, thereby affecting the stability, noise and efficiency of the motor.

Conventionally, when the motor driving efficiency is not good, there are two methods to solve the issue. In the first method, the physical location of the HALL sensor is fine-tuned to adjust the control signal of the driver circuit. In the second method, the PWM driving signal is adjusted by hardware circuitry so that the motor driving current waveform is tuned better.

Referring to FIG. 1, in the first method, the level switching points (i.e., the rising edge S1 and the falling edge S2) of the PWM driving signal exactly follow the rising edge H1 and the falling edge H2 of the HALL signal. Therefore, for different applications of the motors such as different fans, because the characteristics of the motors are different, this method requires adjusting the physical location of the HALL sensor for each different application, in order to adjust the level switching points of the PWM driving signal such that the fan has a desired operation efficiency. The location of the HALL sensor is typically decided for the motor to have an optimum motor driving efficiency when the motor is in full speed operation. However, because the location of the HALL sensor is fixed on the circuit board, the motor driving current will be too high and the operation efficiency is low when the motor operates in low speed. If the location of the HALL sensor is adjusted for the motor to have an optimum motor driving efficiency in low speed, then the motor will be unable to have maximum output power when it operates in high speed.

Referring to FIG. 2 which is a figure cited from U.S. Pat. No. 7,030,584, in the second method, the PWM driving signal is adjusted by hardware circuitry. In this prior art, the turned-OFF time of the PWM driving signal is pulled in (advanced OFF time) to generate the signal 44 shown in the figure. However, such arrangement is not good enough to completely solve the issues of the high current and the low operation efficiency when the motor operates in low speed. Moreover, for a different application such as a different fan, the hardware circuitry needs to be modified correspondingly, and such modification is time-consuming and cost-ineffective.

In addition to the foregoing drawbacks, when the HALL signal causes different motor driving current waveforms (e.g., when the time periods of the high level and the low level of the HALL signal are different), the motor driving current will be too high and imbalanced, as shown by the waveforms C1 and C2 in FIG. 3. And, because the location of the HALL sensor or the hardware circuitry is fixed, the driver circuit can not adaptively adjust the level switching points of the PWM driving signal in response to different HALL signals. Unless the hardware is modified, the poor operation efficiency of the motor (or fan) due to imbalanced motor driving current waveform can not be improved.

In addition, U.S. Pat. No. 7,259,531 also discloses a method for controlling the speed of the motor. The main objective of this prior art is to adaptively adjust the motor driving parameters in response to a change of a loading. However, this prior art can not adjust the motor driving current waveform or motor driving efficiency to the optimum condition under the same loading.

SUMMARY OF THE INVENTION

In view of the foregoing, a first objective of the present invention is to provide a controller capable of improving motor driving efficiency, to improve the drawbacks in the prior art.

A second objective of the present invention is to provide a control method for improving motor driving efficiency.

To achieve the foregoing objectives, in one aspect, the present invention discloses a controller for improving motor driving efficiency, the controller supplying a PWM driving signal to a driver circuit, the controller comprising: a motor speed/period detection unit receiving a signal relating to a motor and detecting the speed and period of the motor; a PWM signal timing calculation unit receiving a plurality of parameters and an output from the motor speed/period detection unit, and determining a timing of the PWM driving signal so that a turned-ON point of the PWM driving signal is earlier than a level switching point of the signal relating to a motor; and a PWM signal generation unit generating the PWM driving signal according to an output from the PWM signal timing calculation unit, wherein the PWM signal timing calculation unit is preferably firmware.

In one embodiment, when the speed of the motor is relatively higher, the turned-ON point of the PWM driving signal is relatively more advanced, and when the speed of the motor is relatively lower, the turned-ON point of the PWM driving signal is relatively less advanced.

In another aspect, the present invention discloses a controller for improving motor driving efficiency, the controller supplying a PWM driving signal to a driver circuit, the controller comprising: a motor speed/period detection unit receiving a signal relating to a motor and detecting the speed and period of the motor; a PWM signal timing calculation unit receiving a plurality of parameters and an output from the motor speed/period detection unit, and determining a timing of the PWM driving signal so that a turned-ON point of the PWM driving signal is later than a level switching point of the signal relating to a motor, wherein when the speed of the motor is relatively higher, the turned-ON point of the PWM driving signal is relatively less delayed, and when the speed of the motor is relatively lower, the turned-ON point of the PWM driving signal is relatively more delayed; and a PWM signal generation unit generating the PWM driving signal according to an output from the PWM signal timing calculation unit.

In another aspect, the present invention discloses a method for improving motor driving efficiency for use in a controller, the controller supplying a PWM driving signal to a driver circuit, the method comprising: receiving a signal relating to a motor and detecting the speed and period of the motor according to the signal; receiving a plurality of parameters and the speed and period of the motor, and determining a timing of the PWM driving signal so that a turned-ON point of the PWM driving signal is earlier than a level switching point of the signal relating to a motor; and generating the PWM driving signal.

In one embodiment, when the speed of the motor is relatively higher, the turned-ON point of the PWM driving signal is relatively more advanced, and when the speed of the motor is relatively lower, the turned-ON point of the PWM driving signal is relatively less advanced.

In another aspect, the present invention discloses a method for improving motor driving efficiency for use in a controller, the controller supplying a PWM driving signal to a driver circuit, the method comprising: receiving a signal relating to a motor and detecting the speed and period of the motor according to the signal; receiving a plurality of parameters and the speed and period of the motor, and determining a timing of the PWM driving signal so that a turned-ON point of the PWM driving signal is later than a level switching point of the signal relating to a motor, wherein when the speed of the motor is relatively higher, the turned-ON point of the PWM driving signal is relatively less delayed, and when the speed of the motor is relatively lower, the turned-ON point of the PWM driving signal is relatively more delayed; and generating the PWM driving signal.

In the aforementioned controller and method, in one embodiment, the signal relating to a motor is a HALL signal, and the plurality of parameters include a parameter for adjusting the turned-ON point of the PWM driving signal and a reference speed of the motor, and the plurality of parameters further include a parameter for adjusting a turned-OFF point of the PWM driving signal.

In one embodiment, referring to FIG. 5, the PWM driving signal includes four PWM signals and the driver circuit includes four transistors, each of which has a gate controlled by a corresponding one of the PWM signals. Preferably, the four transistors are electrically connected in series two by two in two pairs, the series connection node between each pair of transistors connected in series being electrically connected to an end of the motor, and the other ends of the transistors which are not connected with the other transistor in the series connection pair being electrically connected to a supply voltage and ground, respectively; wherein the four PWM signals control the gates of the four transistors such that in any time period, only one of the two transistors electrically connected to the supply voltage is ON and the other is OFF, and only one of the two transistors electrically connected to ground is ON and the other is OFF. While one of the two transistors electrically connected to the supply voltage is ON, the transistor which is connected in series to this transistor and electrically connected to ground is OFF. While the transistor electrically connected to ground is ON, the transistor which is connected in series to this transistor and electrically connected to the supply voltage is OFF.

For better understanding the objectives, characteristics, and effects of the present invention, the present invention will be described below in detail by illustrative embodiments with reference to the attached drawings.

DESCRIPTION OF THE PREFERRED EMBODIMENTS

Figure 1:
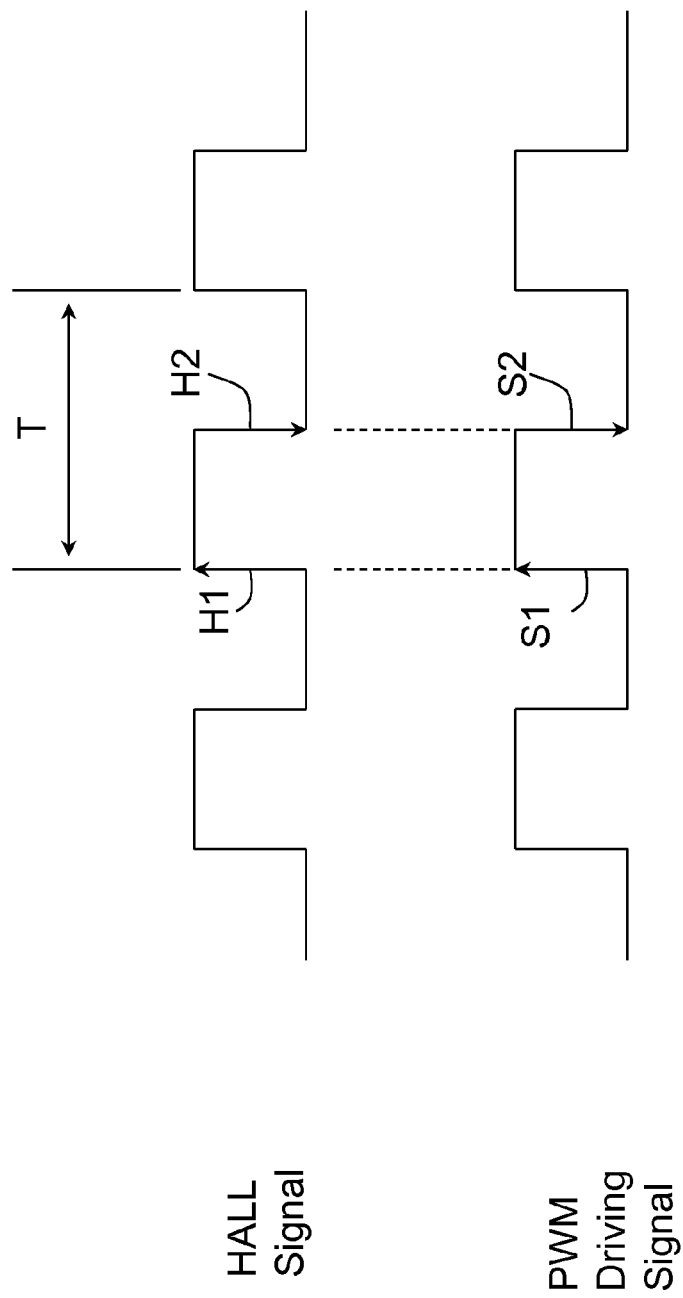
FIGS. 1 and 2 schematically show two conventional methods for adjusting the motor driving current waveforms.
Figure 2:
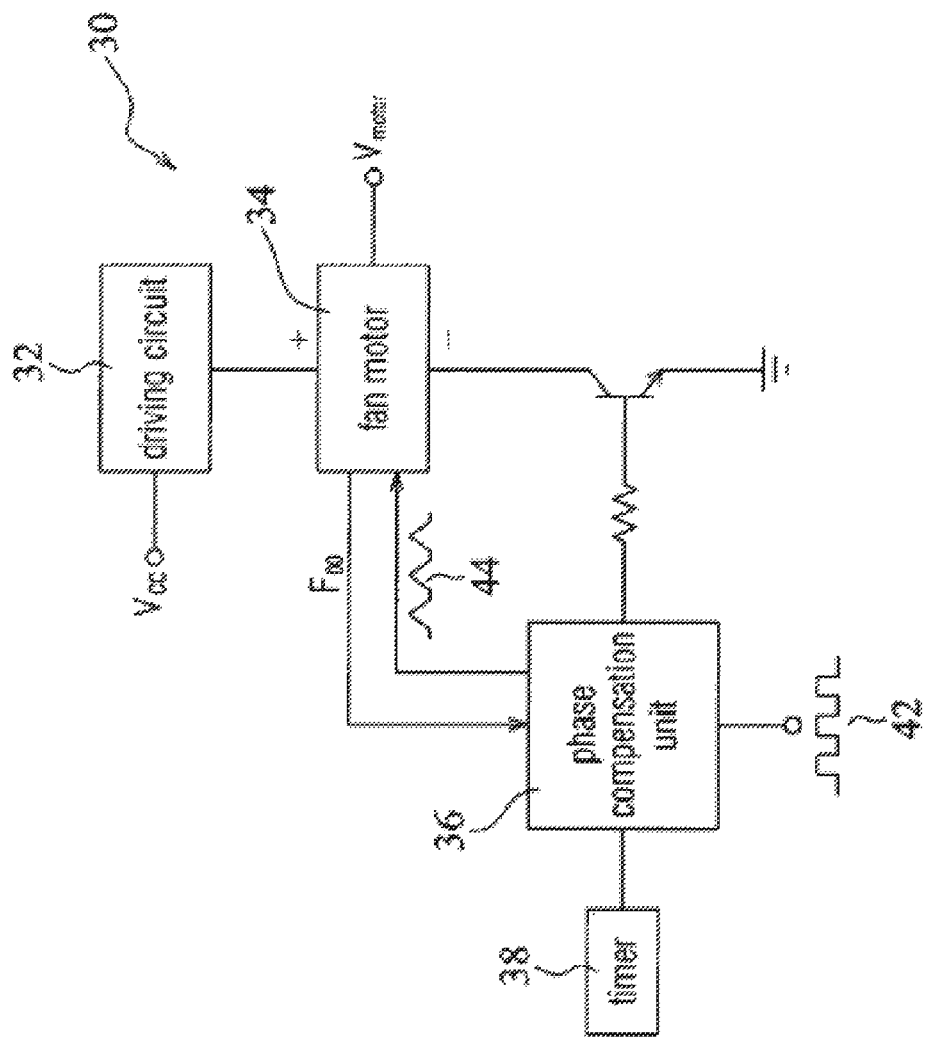
Figure 3:
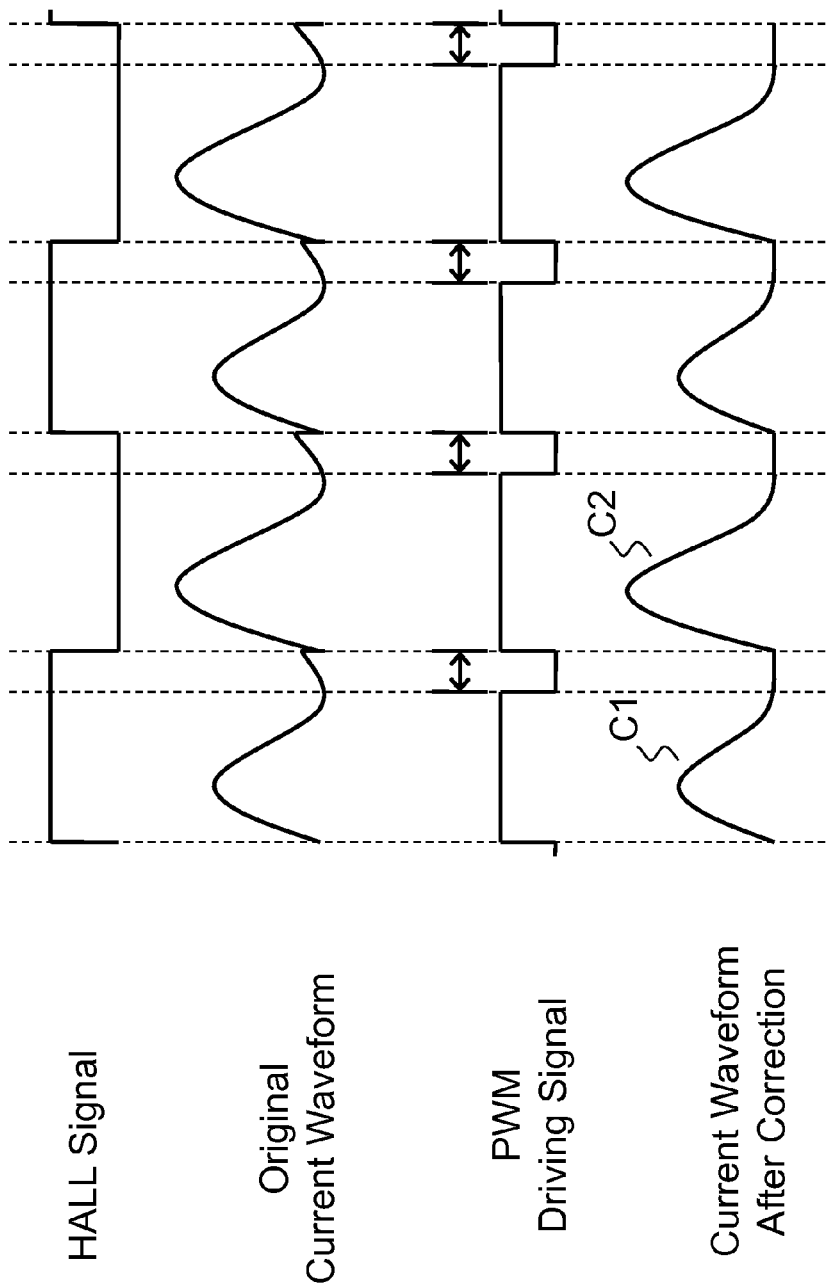
FIG. 3 explains the problem in the prior art.
Figure 4:
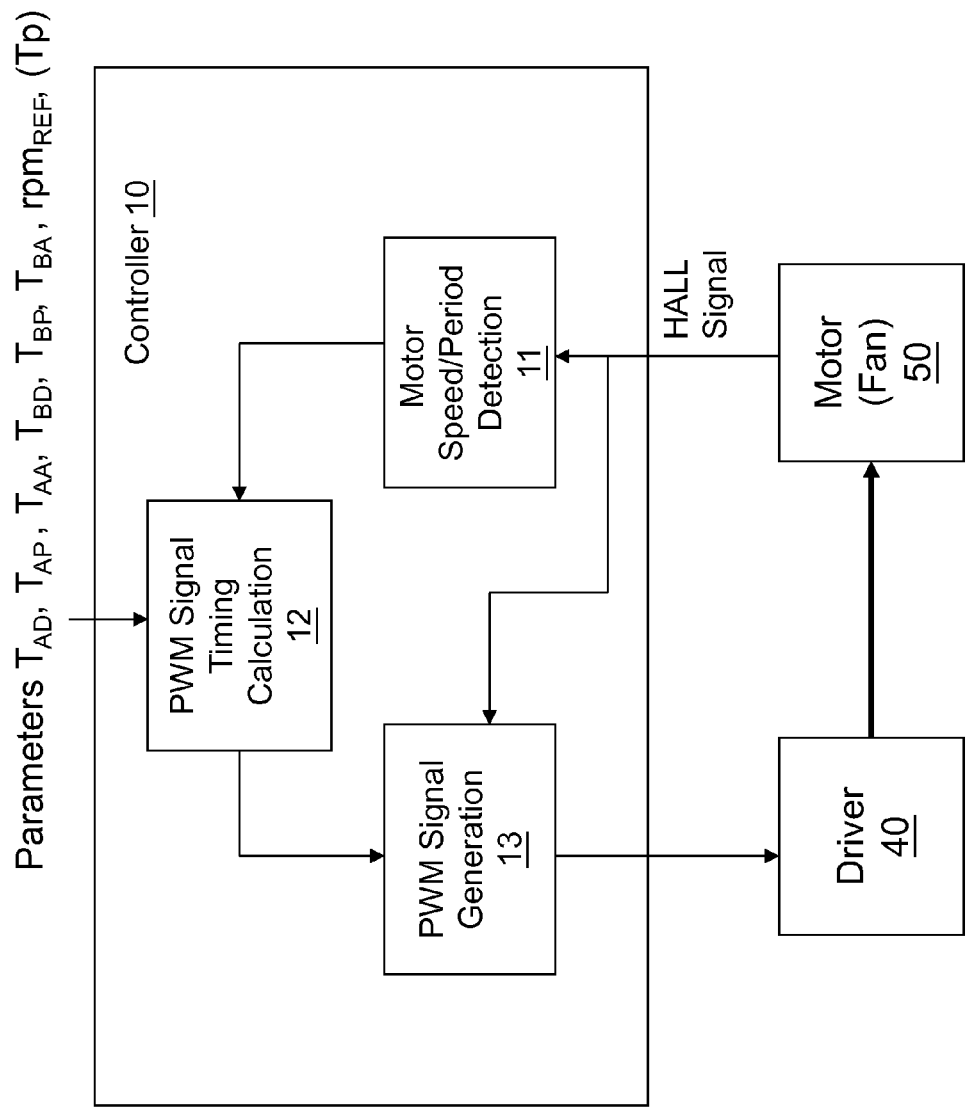
FIG. 4 schematically shows a controller capable of improving motor driving efficiency according to an embodiment of the present invention.

Referring to FIG. 4, in an embodiment of the present invention, the controller 10 capable of improving motor driving efficiency controls a driver circuit 40; the driver circuit 40 drives a motor which is for example a fan motor 50, but can be any other type of motor. The motor generates a HALL signal and feedbacks the signal to the controller 10. The controller 10 includes a motor speed/period detection unit 11, a PWM signal timing calculation unit 12, and a PWM signal generation unit 13. The motor speed/period detection unit 11 calculates the speed and period of the motor based on the HALL signal. The PWM signal timing calculation unit 12 calculates timings to turn ON/OFF the PWM driving signal corresponding to a present and a next level switching point of the HALL signal according to the output from the motor speed/period detection unit 11 and parameters $T_{AD}$, $T_{AP}$, $T_{AA}$, $T_{BD}$, $T_{BP}$, $T_{BA}$, and $rpm_{REF}$ inputted externally, which are preferably stored in the controller 10. $T_{AD}$ and $T_{BD}$ are delayed turned-ON time parameters; $T_{AP}$ and $T_{BP}$ are advanced turned-OFF time parameters; $T_{AA}$ and $T_{BA}$ are advanced turned-ON time parameters; $rpm_{REF}$ is a reference indicating motor speed or period. These parameters will be explained in detail later. The PWM signal generation unit 13 adjusts the PWM driving signal that it provides to the driver circuit 40 according to the HALL signal and the output from the PWM signal timing calculation unit 12. Note that in a preferred embodiment, the motor speed/period detection unit 11 and the PWM signal timing calculation unit 12 are firmware in the controller 10 instead of hardware circuits. Thus, different control parameters can be inputted to the controller 10 according to different characteristics of different fans, and the controller 10 can flexibly adjust the timings to turn ON/OFF the PWM driving signal corresponding to the present and the next level switching point of the HALL signal according to the parameters, the present rotation speed of the fan, and the HALL signal, so that the motor operates in the optimum condition. Such benefit will be explained in detail later.

Figure 5:
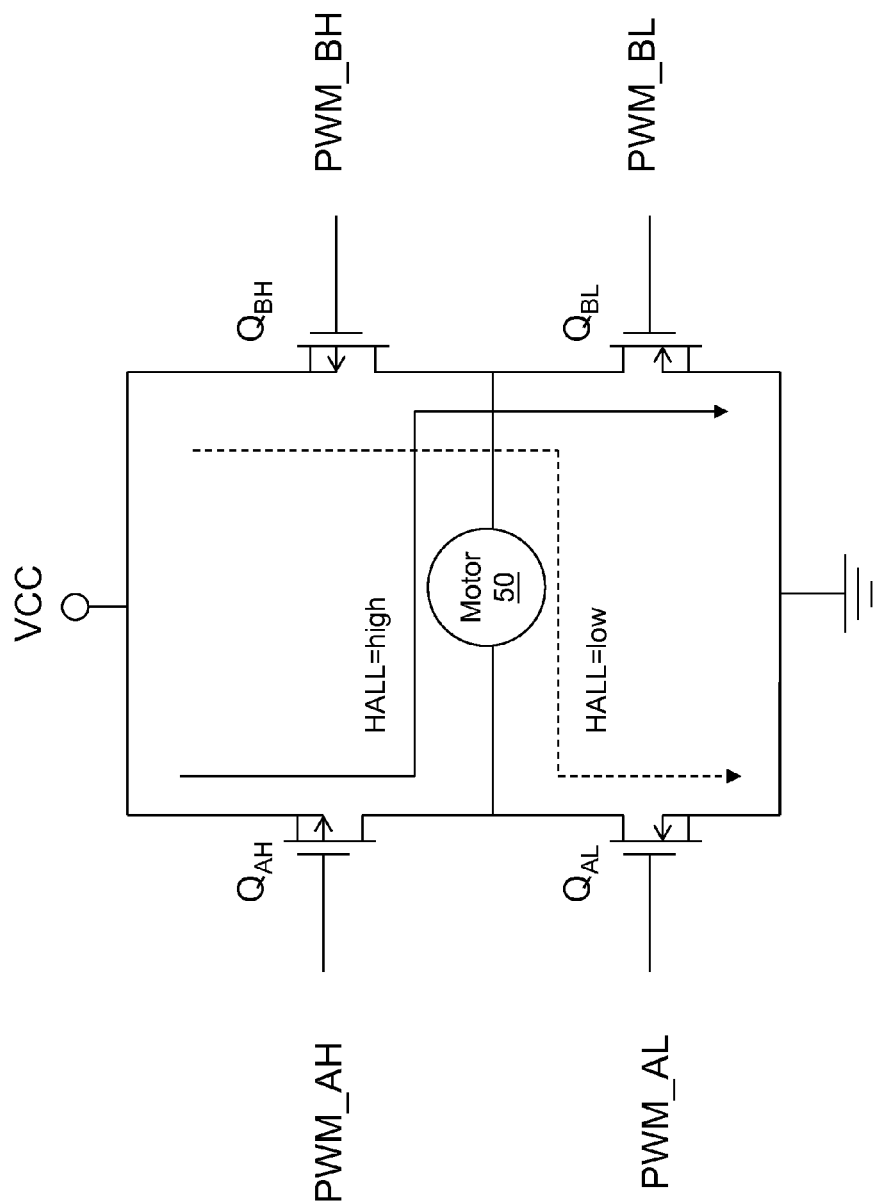
FIG. 5 shows, by way of example, a driver circuit 40 that can be controlled by the present invention.

Referring to FIG. 5 which shows an application that the controller 10 can be applied to, i.e., a driver circuit 40 controlled by the controller 10. The driver circuit 40 includes four transistors $Q_{AH}$, $Q_{AL}$, $Q_{BH}$ and $Q_{BL}$ connected in series two by two in two pairs. The series connection node between a pair of series-connected transistors is connected to one end of a fan motor 50; the other ends of the transistors which are not connected with the other transistor in the series connection pair are connected to a supply voltage VCC and ground, respectively. The controller 10 outputs four PWM signals PWM_AH, PWM_AL, PWM_BH and PWM_BL, controlling the gates of the transistors $Q_{AH}$, $Q_{AL}$, $Q_{BH}$ and $Q_{BL}$ respectively (that is, the PWM driving signal includes four PWM signals in this case). The operation is thus: alternating the direction of the fan motor current according to the HALL signal, to turn ON the transistors $Q_{AH}$ and $Q_{BL}$ when the HALL signal is high, and to turn ON the transistors $Q_{BH}$ and $Q_{AL}$ when the HALL signal is low. That is, in any time period, only one of the two transistors electrically connected to the supply voltage is ON and the other is OFF, and only one of the two transistors electrically connected to ground is ON and the other is OFF. While one of the two transistors electrically connected to the supply voltage is ON, the transistor which is connected in series to this transistor and electrically connected to ground is OFF. While the transistor electrically connected to ground is ON, the transistor which is connected in series to this transistor and electrically connected to the supply voltage is OFF.

Figure 6:
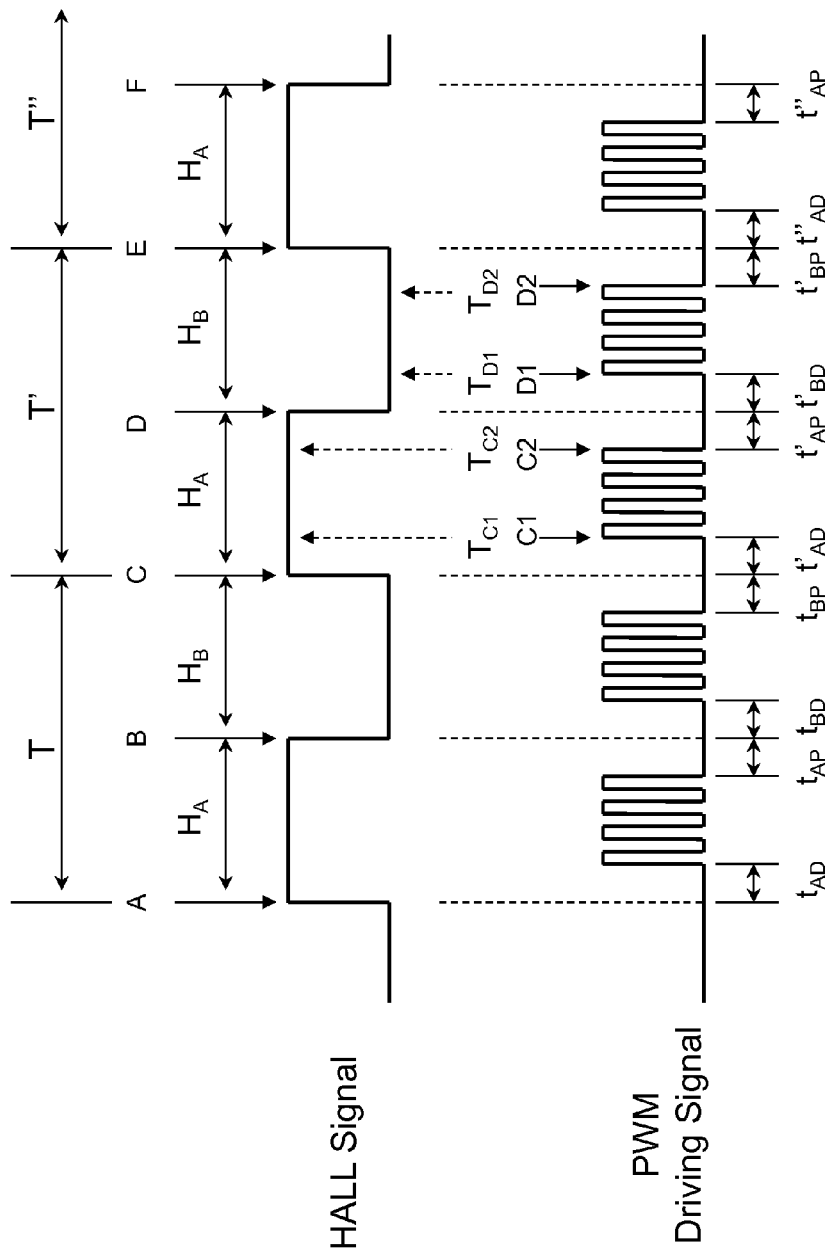
FIG. 6 explains how the PWM driving signal is generated according to the HALL signal and the control parameters.

Referring to FIG. 6, in the present invention, the timings to turn ON/OFF the PWM driving signal corresponding to the present and the next level switching point of the HALL signal are dynamically adjustable, such that the motor operates in an optimum driving efficiency. The speed of the motor is controlled by modulating the duty of the PWM driving signal. In the figure, the high level of the HALL signal is represented by $H_A$ and the low level of the HALL signal is represented by $H_B$. When the HALL signal switches from $H_B$ to $H_A$, the delayed turned-ON time of the PWM driving signal corresponding to such switching from $H_B$ to $H_A$ is denoted by the sub-note AD, and the advanced turned-OFF time is denoted by the sub-note AP; when the HALL signal switches from $H_A$ to $H_B$, the delayed turned-ON time of the PWM driving signal corresponding to such switching from $H_A$ to $H_B$ is denoted by the sub-note BD, and the advanced turned-OFF time is denoted by the sub-note BP. That is, in the first period T including $H_A$ and $H_B$, the delayed turned-ON time of the PWM driving signal corresponding to such switching from $H_B$ to $H_A$ is denoted as $t_{AD}$; the advanced turned-OFF time of the PWM driving signal corresponding to such switching from $H_B$ to $H_A$ is denoted as $t_{AP}$; the delayed turned-ON time of the PWM driving signal corresponding to such switching from $H_A$ to $H_B$ is denoted as $t_{BD}$; the advanced turned-OFF time of the PWM driving signal corresponding to such switching from $H_A$ to $H_B$ is denoted as $t_{BP}$. In the second period T', the delayed turned-ON time of the PWM driving signal corresponding to such switching from $H_B$ to $H_A$ is denoted as $t'_{AD}$; the advanced turned-OFF time of the PWM driving signal corresponding to such switching from $H_B$ to $H_A$ is denoted as $t'_{AP}$; the delayed turned-ON time of the PWM driving signal corresponding to such switching from $H_A$ to $H_B$ is denoted as $t'_{BD}$; the advanced turned-OFF time of the PWM driving signal corresponding to such switching from $H_A$ to $H_B$ is denoted as $t'_{BP}$, and so on for the rest of the PWM driving signal.

The aforementioned numbers of $t_{AD}$, $t_{BD}$, $t_{AP}$ and $t_{BP}$ can be adjusted according to the motor speed to improve the driving efficiency of the motor. In the second period T' of the HALL signal, the motor speed/period detection unit 11 of the controller 10 obtains the information of the previous period T; the PWM signal timing calculation unit 12 calculates the time periods $t'_{AD}$, $t'_{BD}$, $t'_{AP}$ and $t'_{BP}$ according to the motor reference speed $rpm_{REF}$ and the corresponding turned-ON time parameters ($T_{AD}$ and $T_{BD}$) and turned-OFF time parameters ($T_{AP}$ and $T_{BP}$), and further calculates the time points $T_{C1}$, $T_{C2}$, $T_{D1}$ and $T_{D2}$ corresponding to the level switching points C1, C2, D1 and D2 in the present HALL signal period T'. Assuming that the inputted parameters are $T_{AD}$, $T_{BD}$, $T_{AP}$, $T_{BP}$ and $rpm_{REF}$, and the previous HALL signal period is T, then the calculation can follow the equations below:

$$t'_{AD} = T_{AD} - \{T_{AD}/(rpm_{REF}*T)\}$$

$$t'_{AP} = T_{AP}/(rpm_{REF}*T)$$

$$t'_{BD} = T_{BD} - \{T_{BD}/(rpm_{REF}*T)\}$$

$$t'_{BP} = T_{BP}/(rpm_{REF}*T)$$

$$T_{C1} = t'_{AD}$$

$$T_{C2} = T/2 - t'_{AP}$$

$$T_{D1} = T/2 + t'_{BD}$$

$$T_{D2} = T - t'_{BP}$$

Figure 7:
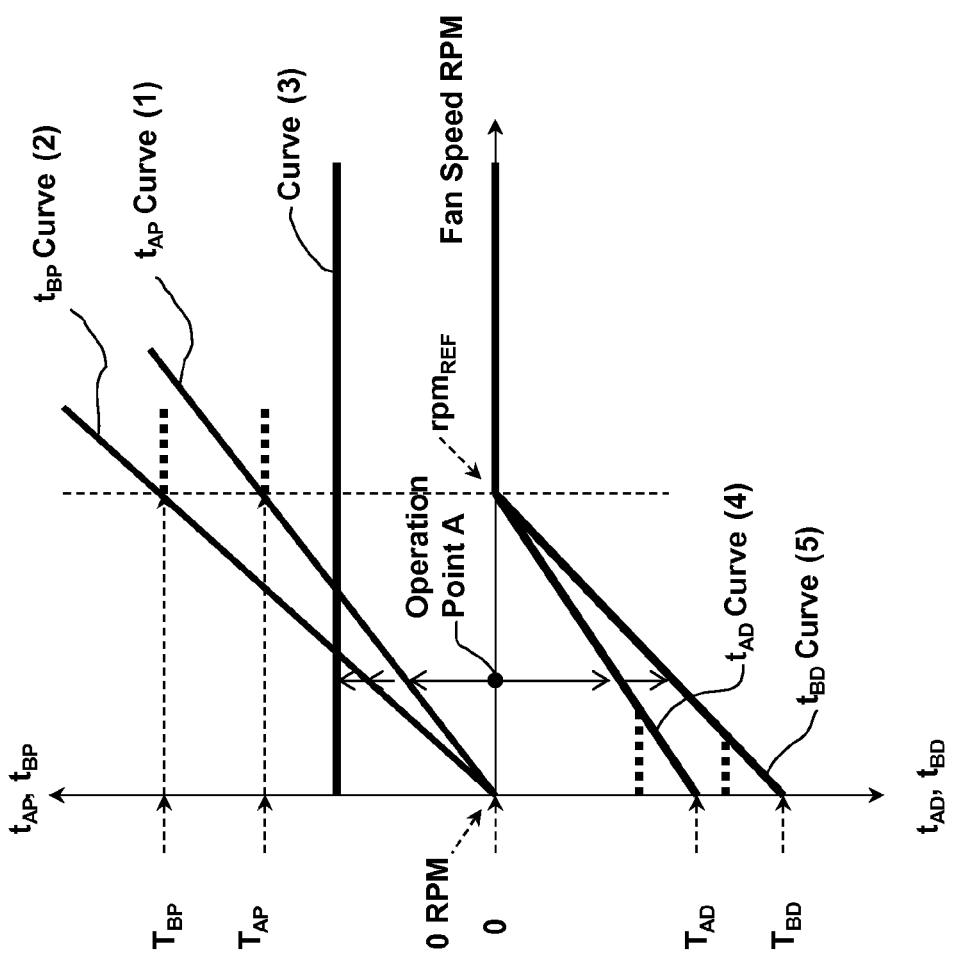
FIG. 7 shows a PWM signal timing calculation unit 12 according to an embodiment of the present invention.

Based on the time points $T_{C1}$, $T_{C2}$, $T_{D1}$ and $T_{D2}$ calculated as above, and the present period information of the HALL signal obtained from the motor speed/period detection unit 11, the PWM signal generation unit 13 switches the PWM driving signal at proper timings; the PWM driving signal is supplied to the driver circuit 40 to drive the fan motor 50. Referring to FIG. 7, in an embodiment of the present invention, $t_{AD}$, $t_{BD}$, $t_{AP}$ and $t_{BP}$ change according to the speed of the motor. In this embodiment, the values of $t_{AP}$ and $t_{BP}$ are positively correlated to the speed of the motor. That is, as shown by $t_{AP}$Curve (1) and $t_{BP}$Curve (2) of FIG. 7, when the speed of the motor is relatively lower, the values of $t_{AP}$ and $t_{BP}$ are relatively smaller, and when the speed of the motor is relatively higher, the values of $t_{AP}$ and $t_{BP}$ are relatively larger. The values of $t_{AD}$ and $t_{BD}$ are negatively correlated to the speed of the motor. That is, as shown by $t_{AD}$Curve (4) and $t_{AD}$Curve (5) of FIG. 7, when the speed of the motor is relatively lower, the values of $t_{AD}$ and $t_{BD}$ are relatively larger, and when the speed of the motor is relatively higher, the values of $t_{AD}$ and $t_{BD}$ are relatively smaller. Thus, by setting different parameters $T_{AD}$, $T_{BD}$, $T_{AP}$ and $T_{BP}$ with reference to the motor reference speed $rpm_{REF}$, at the same motor speed (e.g., the operation point A shown in FIG. 7), different values of $t_{AD}$, $t_{BD}$, $t_{AP}$ and $t_{BP}$ can be set. As such, in the present invention, when the maximum speed of the motor is not satisfactory, or when the motor driving current is too high as the motor operates in low speed, or when motor driving current waveform is imbalanced, the parameters $T_{AD}$, $T_{BD}$, $T_{AP}$, $T_{BP}$ and the motor reference speed $rpm_{REF}$ can be adjusted to optimize the motor driving efficiency without modifying the hardware circuitry. In addition, Curve (3) of FIG. 7 shows another embodiment of $t_{AP}$ and $t_{BP}$ which are a constant value and not correlated with the speed of the motor. This constant value can be set by a turned-OFF time parameter $T_p$, i.e., the parameters $T_{AP}$ and $T_{BP}$ in FIG. 4 are replaced by the parameter $T_p$.

Figure 8:
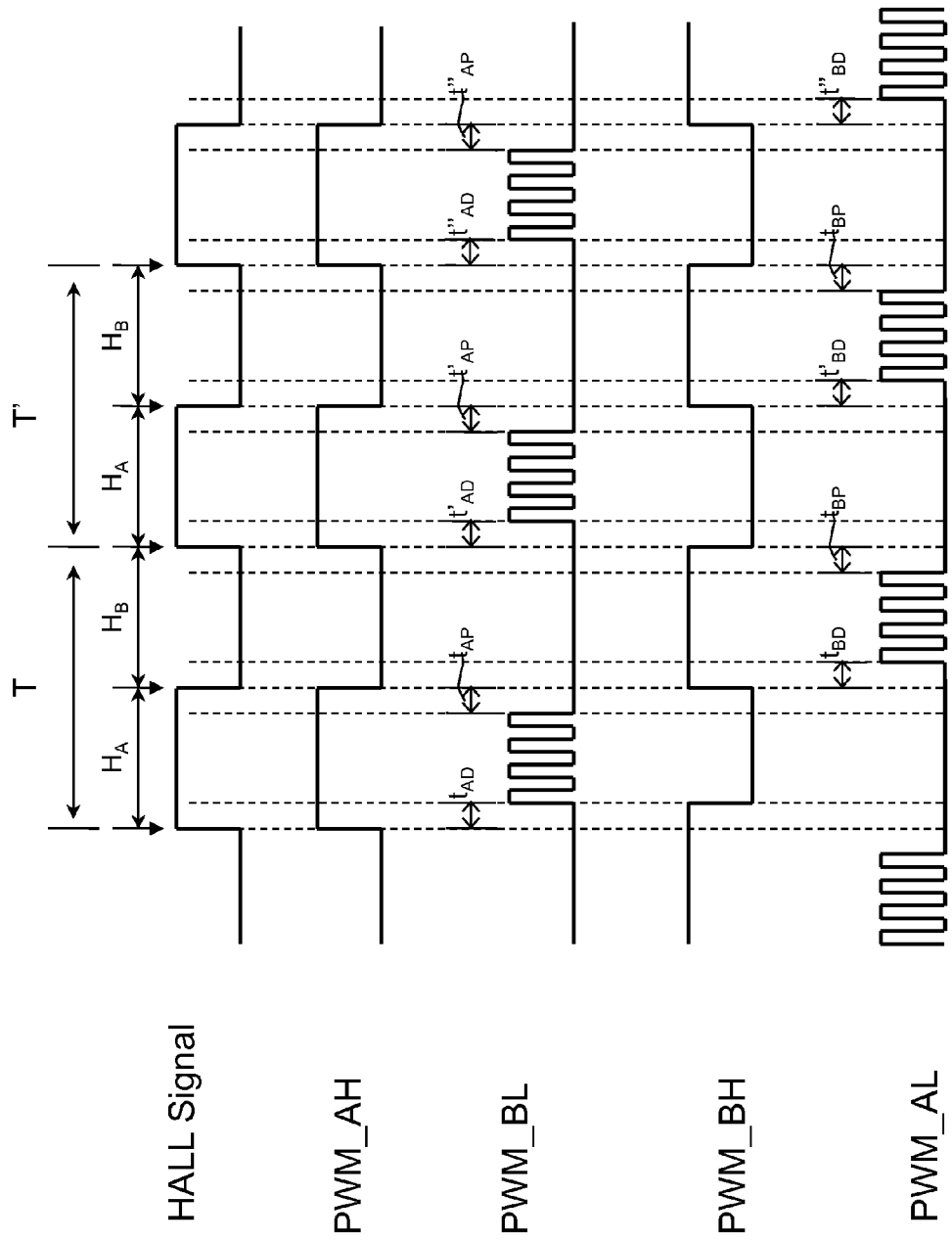
FIG. 8 shows the waveforms of the PWM signals for controlling the driver circuit 40.

An example of the waveforms of the PWM signals in FIG. 5 is shown in FIG. 8. As shown in FIG. 8 with reference to FIG. 4, the PWM signal timing calculation unit 12 of the controller 10 calculates the time periods $t_{AD}$, $t_{BD}$, $t_{AP}$ and $t_{BP}$ in the first period T which includes $H_A$ and $H_B$, and the time periods $t'_{AD}$, $t'_{BD}$, $t'_{AP}$ and $t'_{BP}$ in the second period T' which includes $H_A$ and $H_B$. The PWM signal generation unit 13 generates the PWM signals PWM_AH, PWM_BL, PWM_BH and PWM_AL accordingly, which are supplied to the driver circuit 40 to drive the fan motor 50.

Figure 9:
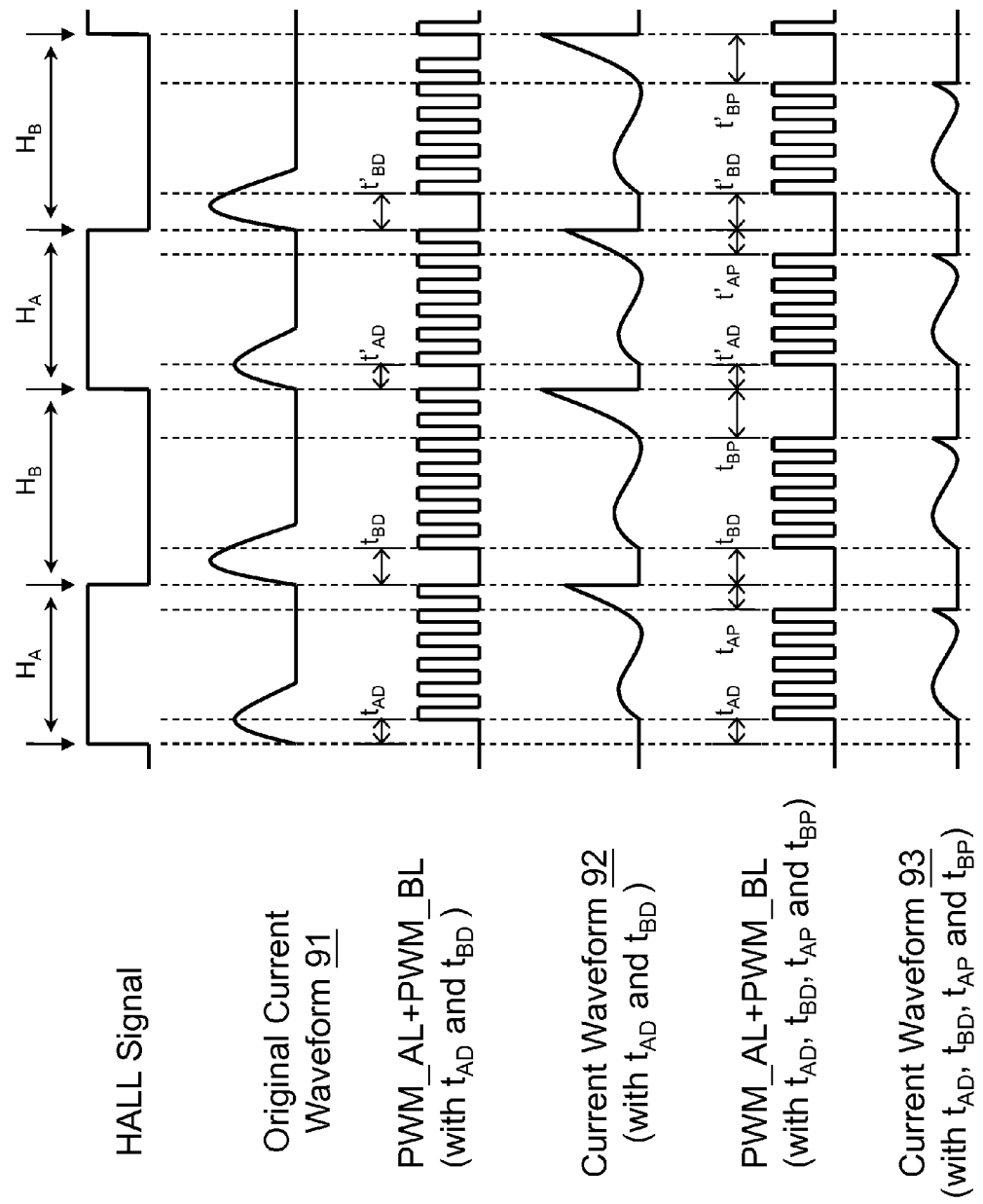
FIG. 9 shows the effect of the present invention.

FIG. 9 shows motor driving current waveforms corresponding to the PWM signals shown in FIG. 8. When the motor operates in low speed and the corresponding current has a high amplitude, a high average and/or an imbalanced waveform such as shown by the waveform 91, the issue can be solved by properly setting $rpm_{REF}$ and the turned-ON time parameters $T_{AD}$ and $T_{BD}$, and this can be fulfilled by setting $T_{BD}$ larger than $T_{AD}$ (also referring to FIG. 7). If the current after correction has a high amplitude at its right rear ends, such as shown by the waveform 92, the issue can be solved by properly setting the turned-OFF time parameters $T_{AP}$ and $T_{BP}$, and this can be fulfilled by setting $T_{BP}$ larger than $T_{AP}$ (referring to FIG. 7), thus optimizing the waveform (current waveform 93). As shown in FIG. 7, the values of $t_{AD}$ and $t_{BD}$ are negatively correlated with the speed of the motor. Thus, the values of $t_{AD}$ and $t_{BD}$ can be zero under high motor speed, so they will not affect the motor driving efficiency when the motor operates under high motor speed. The parameters can be adjusted automatically and dynamically during motor operation, preferably by a computer program, so that the adjustment has a fast response time and is very efficient. The determined parameters can be stored into the controller 10, so that the motor always operates under the optimum motor driving efficiency.

Figure 10:
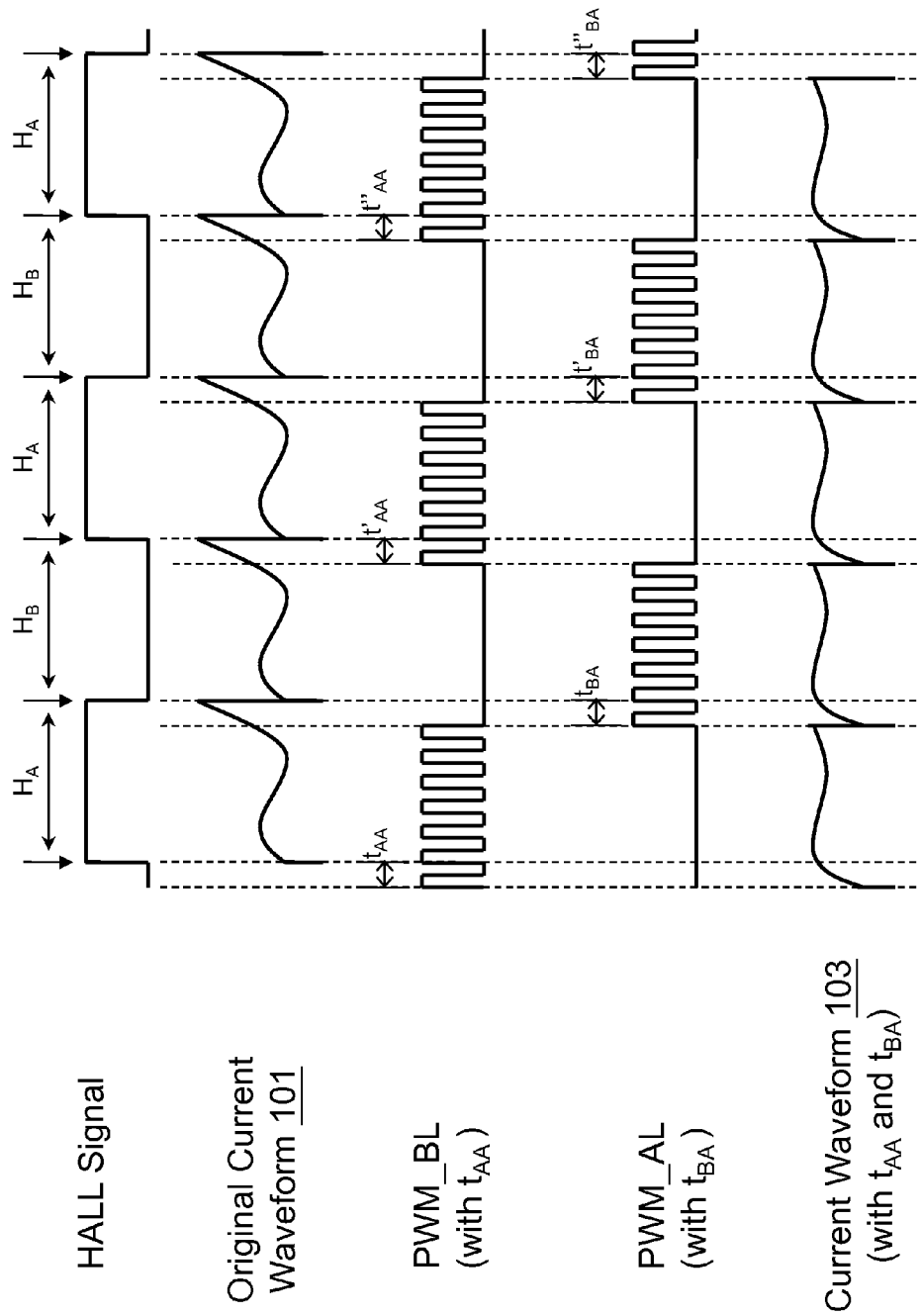
FIG. 10 shows another effect of the present invention.

Referring to FIG. 10, if the original current waveform does not have a high amplitude and high average, but has a problem that the full speed is less than optimum and the efficiency is not satisfactory, for example as shown by the waveform 101 in FIG. 10, the delayed time periods $t_{AD}$ and $t_{BD}$ can be set to 0, and the turned-ON time points can be moved forward by setting the advanced turned-ON time parameters $T_{AA}$ and $T_{BA}$. That is, the PWM driving signal PWM_BL is turned ON earlier than the level switching point from $H_B$ to $H_A$, by $t_{AA}$. The PWM driving signal PWM_AL is turned ON earlier than the level switching point from $H_A$ to $H_B$, by $t_{BA}$. The values of $t_{AA}$ and $t_{BA}$ are positively correlated with the speed of the motor, similar the values of $t_{AP}$ and $t_{BP}$. That is, when the speed of the motor is relatively lower, the values of $t_{AA}$ and $t_{BA}$ are relatively smaller. Thus, when the motor operates under low speed, the amplitude and the average of the current will not be overly high because of the values of $t_{AA}$ and $t_{BA}$. On the other hand, when the speed of the motor is relatively higher, the values of $t_{AA}$ and $t_{BA}$ are relatively larger, which optimizes the motor driving efficiency under high motor speed because of higher values of $t_{AA}$ and $t_{BA}$. The above adjustment provides an effect equivalent to moving the physical location of the HALL sensor, without modifying the hardware. In other words, the controller 10 of the present invention can be adaptively adjusted in correspondence to its application environments, such as the physical location of the HALL sensor and the characteristics of the fan; the parameters $T_{AD}$, $T_{AP}$, $T_{AA}$, $T_{BD}$, $T_{BP}$, $T_{BA}$ and $rpm_{REF}$ can be dynamically and effectively set to optimize the motor driving efficiency, without modifying the location of the HALL sensor and the hardware circuitry.

In summary, in comparison with prior art, the present invention has at least the following advantages: (1) it is more flexible because it can be readily applied to any application environment, by changing the settings of the parameters without modification of hardware circuitry; (2) the motor driving efficiency is improved.

The features, characteristics and effects of the present invention have been described with reference to its preferred embodiments, which are provided only for illustrative purpose and not for limitation of the scope. An embodiment or a claim of the present invention does not need to achieve all the objectives or advantages of the present invention. The title and abstract are provided for assisting searches but not for limiting the scope of the present invention. Various other substitutions and modifications will occur to one skilled in the art, without departing from the spirit of the present invention. For example, the present invention can be applied to any motor system, not only the fan motors. Therefore, all such substitutions and modifications are intended to be embraced within the scope of the invention as defined in the appended claims.

What is claimed is:

1. A controller for improving motor driving efficiency, the controller supplying a PWM driving signal to a driver circuit, the controller comprising:

a motor speed/period detection unit receiving a signal relating to a motor and detecting the speed and period of the motor;

a PWM signal timing calculation unit receiving a plurality of parameters and an output from the motor speed/period detection unit, and determining a timing of the PWM driving signal so that a turned-ON point of the PWM driving signal is earlier than a level switching point of the signal relating to a motor; and a PWM signal generation unit generating the PWM driving signal according to an output from the PWM signal timing calculation unit.

2. The controller of claim 1, wherein when the speed of the motor is relatively higher, the turned-ON point of the PWM driving signal is relatively more advanced, and when the speed of the motor is relatively lower, the turned-ON point of the PWM driving signal is relatively less advanced.

3. The controller of claim 2, wherein the signal relating to a motor is a HALL signal.

4. The controller of claim 2, wherein the PWM driving signal includes four PWM signals and the driver circuit includes four transistors, each of which has a gate controlled by a corresponding one of the PWM signals.

5. The controller of claim 1, wherein the plurality of parameters include a parameter for adjusting the turned-ON point of the PWM driving signal and a reference speed of the motor.

6. The controller of claim 5, wherein the plurality of parameters further include a parameter for adjusting a turned-OFF point of the PWM driving signal.

7. A controller for improving motor driving efficiency, the controller supplying a PWM driving signal to a driver circuit, the controller comprising:

a motor speed/period detection unit receiving a signal relating to a motor and detecting the speed and period of the motor;

a PWM signal timing calculation unit receiving a plurality of parameters and an output from the motor speed/period detection unit, and determining a timing of the PWM driving signal so that a turned-ON point of the PWM driving signal is later than a level switching point of the signal relating to a motor, wherein when the speed of the motor is relatively higher, the turned-ON point of the PWM driving signal is relatively less delayed, and when the speed of the motor is relatively lower, the turned-ON point of the PWM driving signal is relatively more delayed; and a PWM signal generation unit generating the PWM driving signal according to an output from the PWM signal timing calculation unit.

8. The controller of claim 7, wherein the signal relating to a motor is a HALL signal.

9. The controller of claim 7, wherein the PWM driving signal includes four PWM signals and the driver circuit includes corresponding four transistors, each of which has a gate controlled by a corresponding one of the PWM signals.

10. The controller of claim 7, wherein the plurality of parameters include a parameter for adjusting the turned-ON point of the PWM driving signal and a reference speed of the motor.

11. The controller of claim 10, wherein the plurality of parameters further include a parameter for adjusting a turned-OFF point of the PWM driving signal.

12. A method for improving motor driving efficiency for use in a controller, the controller supplying a PWM driving signal to a driver circuit, the method comprising:

receiving a signal relating to a motor and detecting the speed and period of the motor according to the signal;

receiving a plurality of parameters and the speed and period of the motor, and determining a timing of the PWM driving signal so that a turned-ON point of the PWM driving signal is earlier than a level switching point of the signal relating to a motor; and generating the PWM driving signal.

13. The method of claim 12, wherein when the speed of the motor is relatively higher, the turned-ON point of the PWM driving signal is relatively more advanced, and when the speed of the motor is relatively lower, the turned-ON point of the PWM driving signal is relatively less advanced.

14. The method of claim 13, wherein the signal relating to a motor is a HALL signal.

15. The method of claim 12, wherein the PWM driving signal includes four PWM signals and the driver circuit includes four transistors, each of which has a gate controlled by a corresponding one of the PWM signals.

16. The method of claim 12, wherein the plurality of parameters include a parameter for adjusting the turned-ON point of the PWM driving signal and a reference speed of the motor.

17. The method of claim 16, wherein the plurality of parameters further include a parameter for adjusting a turned-OFF point of the PWM driving signal.

18. A method for improving motor driving efficiency for use in a controller, the controller supplying a PWM driving signal to a driver circuit, the method comprising:

receiving a signal relating to a motor and detecting the speed and period of the motor according to the signal;

receiving a plurality of parameters and the speed and period of the motor, and determining a timing of the PWM driving signal so that a turned-ON point of the PWM driving signal is later than a level switching point of the signal relating to a motor, wherein when the speed of the motor is relatively higher, the turned-ON point of the PWM driving signal is relatively less delayed, and when the speed of the motor is relatively lower, the turned-ON point of the PWM driving signal is relatively more delayed; and generating the PWM driving signal.

19. The method of claim 18, wherein the signal relating to a motor is a HALL signal.

20. The method of claim 19, wherein the PWM driving signal includes four PWM signals and the driver circuit includes four transistors, each of which has a gate controlled by a corresponding one of the PWM signals.

21. The method of claim 18, wherein the plurality of parameters include a parameter for adjusting the turned-ON point of the PWM driving signal and a reference speed of the motor.

22. The method of claim 21, wherein the plurality of parameters further include a parameter for adjusting a turned-OFF point of the PWM driving signal.

* * * * *